(12) United States Patent
Kempf

(10) Patent No.: US 9,417,158 B2
(45) Date of Patent: Aug. 16, 2016

(54) ELECTRONIC UNIT FOR MEASURING OPERATING PARAMETERS OF A VEHICLE WHEEL, COMPRISING AN ELECTRONIC MODULE AND AN INFLATION VALVE

(75) Inventor: Christian Kempf, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 79 days.

(21) Appl. No.: 14/234,467

(22) PCT Filed: Jul. 18, 2012

(86) PCT No.: PCT/EP2012/003019
§ 371 (c)(1),
(2), (4) Date: Apr. 15, 2014

(87) PCT Pub. No.: WO2013/013789
PCT Pub. Date: Jan. 31, 2013

(65) Prior Publication Data
US 2014/0283923 A1    Sep. 25, 2014

(30) Foreign Application Priority Data

Jul. 28, 2011 (FR) ..................... 11 02363

(51) Int. Cl.
*G01M 17/02* (2006.01)
*B60C 29/00* (2006.01)
(Continued)

(52) U.S. Cl.
CPC ........... *G01M 17/02* (2013.01); *B60C 23/0494* (2013.01); *B60C 29/00* (2013.01); *B60C 29/005* (2013.01); *B60C 29/02* (2013.01); *B60C 29/06* (2013.01); *Y10T 137/3662* (2015.04)

(58) Field of Classification Search
CPC .. B60C 23/0494; B60C 29/00; B60C 29/005; B60C 29/02; B60C 29/06; G01M 17/02; Y10T 137/3662
See application file for complete search history.

(56) References Cited

U.S. PATENT DOCUMENTS

| 7,040,155 B1 | 5/2006 | Lundell et al. |
| 2006/0125612 A1 | 6/2006 | Okubo et al. |

(Continued)

FOREIGN PATENT DOCUMENTS

| CN | 1781745 | 6/2006 |
| DE | 20 2009 007703 U1 | 6/2010 |

(Continued)

OTHER PUBLICATIONS

International Search Report, dated Sep. 19, 2012, from corresponding PCT application.

*Primary Examiner* — Kevin Murphy
*Assistant Examiner* — Patrick Williams
(74) *Attorney, Agent, or Firm* — Young & Thompson

(57) ABSTRACT

The electronic unit includes an inflation valve adapted to be secured to a wheel rim and including an abutment head against the rim, extending in the continuation of which are a rigid tube, an electronic module mounted in a slidable manner along the tube, and elements for the relative locking in translation of the module along the tube, defining at least two positions of relative locking, each adapted to correspond to a preselected thickness of the rim intended to be equipped with the unit. The module and abutment head include two complementary front faces adapted in order to come into correspondence at a predetermined minimum distance from each other that is identical for all the preselected widths of rims intended to be equipped with the unit. Optical tracking devices are provided to permit verification of whether the distance separating the two complementary front faces corresponds to the predetermined minimum distance.

6 Claims, 1 Drawing Sheet

(51) Int. Cl.
*B60C 29/02* (2006.01)
*B60C 29/06* (2006.01)
*B60C 23/04* (2006.01)

(56) References Cited

U.S. PATENT DOCUMENTS

2007/0113637 A1* 5/2007 Blossfeld ............ B60C 23/0408 73/146.8
2008/0173082 A1* 7/2008 Hettle ................. B60C 23/0408 73/146.5
2009/0007649 A1 1/2009 Kempf et al.
2011/0248204 A1 10/2011 Palaoro et al.
2012/0312389 A1 12/2012 Kempf

FOREIGN PATENT DOCUMENTS

| EP | 1 911 610 A1 | 4/2008 |
| FR | 2 918 315 A1 | 1/2009 |
| FR | 2 954 733 A1 | 4/2010 |
| WO | 2008151267 A1 | 12/2008 |
| WO | 2009/007035 A1 | 1/2009 |

* cited by examiner

ELECTRONIC UNIT FOR MEASURING OPERATING PARAMETERS OF A VEHICLE WHEEL, COMPRISING AN ELECTRONIC MODULE AND AN INFLATION VALVE

BACKGROUND OF THE INVENTION

1. Field of the Invention

The invention relates to an electronic unit for measuring operating parameters of a vehicle wheel, comprising an electronic module and an inflation valve.

2. Description of the Related Art

An increasing number of motor vehicles possess systems for monitoring and/or measuring parameters including sensors.

By way of example with respect to such systems, mention may be made of the systems for monitoring the pressure of tires including electronic modules mounted on each of the wheels of the vehicles, dedicated to the measurement of parameters such as the pressure and/or temperature of the tires fitted to these wheels, and intended to inform the driver of any abnormal variation in the measured parameter.

One of the existing solutions most commonly used to ensure the attachment of the electronic modules on the rims of the wheels involves the provision of electronic units each composed of an electronic module assembled together with an inflation valve allowing said electronic module to be secured on the rim of the wheel.

One solution relating to such electronic units involves the provision of specific inflation valves capable of ensuring the transmission of the forces to which the electronic modules are subjected. However, this solution has proven to be expensive because, in addition to the high price of the inflation valves, which are generally made entirely of metal, it also requires the provision of ancillary parts (nuts, sealing gaskets, etc.) specially designed to guarantee a sealed attachment of the inflation valves on the rims.

With a view to overcoming this drawback, a second solution has involved the provision of the inflation valves in an elastomeric material, having the same basic design as the traditional inflation valves of the "snap-in" type, modified in such a way as to ensure the absorption of the forces to which the electronic modules are subjected.

This solution has resulted in particular in the provision of an electronic unit as described in patent application WO2009/007035 comprising:
  an electronic module,
  an inflation valve of the "snap-in" type including:
    a valve body in an elastomeric material, provided with a longitudinal axial bore and intended to extend through an orifice arranged in the rim, said valve body being composed of an elastically deformable trunk and an abutment head against the rim, separated from the trunk by a collar adapted to be positioned in a sealed manner in the orifice arranged in said rim,
    and a hollow tubular core made of a rigid material, accommodating a covering mechanism and having dimensions adapted for it to be accommodated in the bore of the valve body and to extend to either side in the continuation of said valve body, said tubular core being constituted by two longitudinal sections arranged one in relation to the other and relative to the valve body, in such a way as to allow an elastic deformation of the trunk capable of permitting the installation of the inflation valve through the orifice of the rim,
  and means for connecting the electronic module and the inflation valve comprising:
    a ring connected to the electronic module adapted to be mounted in a sliding manner around the portion of the tubular core extending in the continuation of the abutment head of the valve body, in a position of the electronic module where the latter extends in the direct continuation of the inflation valve,
    and means of assembly by the fitting of a hollow sleeve connected to the ring of the electronic module in the interior of an annular chamber arranged in the abutment head of the valve body.

In view of these particular characteristics, and in practice, such an electronic unit has the added advantage of guaranteeing a behavior of the inflation valve similar to that of a traditional inflation valve of the "snap-in" type.

On the other hand, according to this principle, the assembly of the electronic module and of the valve body is accomplished with the help of a connection of the sleeve fitting type, the resistance of which is linked directly to the resistance to stretching of the elastomeric material of the inflation valve. This connection should, in fact, be of a removable nature with a view in particular to permitting the electronic module to be recovered in the event of damage to the inflation valve. As a result, it is very difficult to arrive at a compromise between the resistance, on the one hand allowing the removal of the two elements, and on the other hand guaranteeing the durability of the connection at the high speeds of the vehicles. For this reason and in practice, the electronic units include an additional removable locking device of the type described in the patent application WO2009/007035, being an elastic ring, a spring ring of the "lyre" type, an "O-clamp" crimping collar, a screw clamp, or various types of locking key. However, these additional devices require specific tooling for the purpose of their positioning and their retraction, with the result, furthermore, that the stages of installation and removal of the electronic units become more complex.

With a view to overcoming this drawback, a solution as described in particular in patent FR 2 954 733 has involved the provision of an electronic unit equipped with a locking device guaranteeing a very high resistance to pulling out of the electronic module, but not requiring additional time.

For this purpose, this electronic unit comprises:
  an inflation valve including, on the one hand, a valve body intended to extend through an orifice arranged in a wheel rim, and composed of a trunk and an abutment head against the rim, and, on the other hand, a rigid hollow tube extending in the continuation of the abutment head,
  an electronic module secured to a ring adapted to be mounted in a sliding manner about the rigid tube,
  and means for securing the electronic module and the inflation valve, comprising means of locking including:
    transverse notches arranged on the periphery of the rigid tube,
    and a plate latch associated with the electronic module and exhibiting a locking tooth adapted to be accommodated in a transverse notch of the rigid tube, in such a way as to ensure the locking in translation of said electronic module relative to said rigid tube, said plate latch:
      being mounted on the electronic module with a possibility of deflection between a position of locking in which the locking tooth is engaged in a notch in the rigid tube, and a position of unlocking in which the locking tooth allows a relative displacement in translation of the electronic module relative to the rigid tube, being associated with elastic means adapted, in the absence of loads, to apply to this plate latch a force for maintaining the latter in its position of locking, and, during an influence exerted on these elastic means, in order to bring about a displacement of this plate latch towards its position of unlocking.

According to this solution, the locking of the electronic module on the inflation valve is thus assured by a plate latch being maintained in a natural locking position by elastic means, and designed to be switched towards an unlocking position by a simple influence exerted on said elastic means.

As a result, the locking means provide rigid locking of the electronic module on the rigid tube of the inflation valve, thereby guaranteeing a very high resistance to pulling out of said electronic module.

Such a solution has a major drawback, however, likewise resulting from the necessity to possess special tooling in order to guarantee, at the time of installation of the electronic unit on rims having different thicknesses, that the notch in which the locking tooth is accommodated consists of the accessible notch situated closest to the abutment head, which alone is capable of permitting high performances of the inflation valves to be guaranteed, in particular in terms of longevity and sealing.

Whereas the automobile manufacturers routinely possess such tooling, the same does not apply to the garages that are called upon in particular to replace damaged inflation valves, and the risks of imperfect assembly resulting in a notable impairment of the performance of the new inflation valve are not negligible.

BRIEF SUMMARY OF THE INVENTION

The present invention proposes to overcome this drawback and has as its principal objective to permit verification, in a very fast and easy manner, of the quality of the assembly between an inflation valve and an electronic module.

For this purpose, the invention proposes an electronic unit for measuring operating parameters of a vehicle wheel, comprising:
- an inflation valve including, on the one hand, a valve body intended to extend through an orifice arranged in a wheel rim, and composed of a trunk and an abutment head against the rim, and, on the other hand, a rigid hollow tube extending in the continuation of the abutment head,
- an electronic module adapted to be mounted in a slidable manner about the rigid tube,
- and means for securing the electronic module and the inflation valve in a position, known as the locked position, of said electronic module, where the latter extends in the direct continuation of the abutment head of said inflation valve, said means for securing comprising means of locking including devices for the relative locking in translation of the electronic module along the rigid tube, defining at least two positions of relative locking, each adapted to correspond to a preselected thickness of the rim intended to be equipped with the electronic unit.

According to the invention, this electronic unit is characterized, furthermore, in that the electronic module and the abutment head of the inflation valve comprise:
- two complementary front faces adapted in order to come into correspondence in the locked position of the electronic module, at a predetermined minimum distance one from the other that is identical for all the preselected widths of rims intended to be equipped with the electronic unit,
- devices for the optical tracking of the longitudinal position of the electronic module along the rigid tube, adapted to permit verification of whether the distance separating the two complementary front faces, in the locked position of said electronic module, corresponds to the predetermined minimum distance.

According to the invention, the two elements of the electronic unit, being the electronic module and the inflation valve, thus possess corresponding front faces adapted in order to be separated by a constant distance regardless of the thickness of the rim equipped with the electronic unit, and equipped with tracking means permitting optical verification of whether the distance separating said front faces corresponds to the desired distance.

Such electronic units may include any type of inflation valve equipped with a rigid tube extending in the continuation of the abutment head of the valve body, but are particularly relevant when the inflation valve is a valve of the "snap-in" type including:
- a valve body made of an elastomeric material, provided with a longitudinal axial bore and composed of an elastically deformable trunk and an abutment head separated from the trunk by a collar adapted to be positioned in a sealed manner in the orifice arranged in the rim,
- and a hollow tubular core made of a rigid material having dimensions adapted to be accommodated in the bore of the valve body and to extend to either side in the continuation of said valve body, said tubular core being constituted by two longitudinal sections arranged one in relation to the other and relative to the valve body, in such a way as to allow an elastic deformation of the trunk capable of permitting the installation of the inflation valve through the orifice of the rim.

In effect, with regard to such inflation valves, the performances of the latter in terms of sealing and longevity are reduced markedly during installation of the electronic module leading to an increase in the offset of the center of gravity of the electronic unit in relation to the position of the center of gravity of the inflation valve alone. The operation of verifying the conformity of the assembly is thus of primary importance with such inflation valves.

Furthermore, the means of locking the electronic unit according to the invention advantageously comprise:
- locking devices arranged on the periphery of the rigid tube, consisting of at least two transverse notches,
- and a plate latch associated with the electronic module and exhibiting a locking device consisting of a locking tooth adapted to be accommodated in one of the transverse notches of the rigid tube, in the locked position of the electronic module, said plate latch:
  - being mounted on the electronic module with a possibility of deflection between a position of locking in which the locking tooth is engaged in a notch of the rigid tube, and a position of unlocking in which the locking tooth allows a relative displacement in translation of the electronic module relative to the rigid tube,
  - being associated with elastic means adapted, in the absence of loads, in order to apply to this plate latch a force for maintaining the latter in its locking position, and, during an influence exerted on these elastic means, in order to bring about a displacement of this plate latch towards its unlocking position.

According to another advantageous embodiment of the invention, the means for the optical tracking of the electronic unit include at least one projecting lug extending in relation to a peripheral portion of the front face of one of the elements, being the electronic module or the abutment head, and having a length matching the minimum predetermined distance for the locked position of the electronic module.

This very simple implementation solution, furthermore, results in the provision, between the two front faces, of a barrier that counteracts, during removal of a tire that is undertaken without taking account of the instructions for use, the insertion of this tire into the gap separating said front faces, with the likelihood of destroying the connection devices between the electronic module and the inflation valve.

With a view to increasing the effectiveness of the protection offered by the obstacle constituted by the lug, the latter is, furthermore, advantageously arranged in such a way as to be positioned, in the assembled position of the electronic module and of the inflation valve, opposite the generator of the orifice arranged in the rim furthest from the base of said rim.

According to another advantageous embodiment of the invention, the means of optical tracking include at least one projecting lug extending in relation to the front face of one of the elements, being the electronic module or the abutment head, exhibiting a length substantially greater than the minimum predetermined distance for the locked position of the electronic module, and a recess having a form adapted in order to accommodate the extremity of said lug, arranged opposite one another in the front face of the other element, being the abutment head or the electronic module.

These provisions lead to the realization of devices for the indexation in rotation of the relative position of the electronic module and of the inflation valve, which make it possible in particular to orient the inflation valve in an appropriate manner at the time of its installation on the rim, with a view subsequently to obtaining an appropriate orientation of the electronic module at the time of its assembly with said inflation valve.

According to another advantageous embodiment of the invention, the electronic module and the abutment head include complementary parallel front faces arranged in such a way that said electronic module is inclined at an angle in the order of 10° to 40° in relation to the longitudinal axis of the valve body.

Such an inclination makes it possible to maintain the electronic modules substantially in contact with the base of the rims (for a wide range of rims available on the market), and thus to limit the forces to which they are subjected.

BRIEF DESCRIPTION OF THE DRAWINGS

Other characteristics, aims and advantages of the invention will be appreciated from the following detailed description with reference to the accompanying drawings, which represent a preferred embodiment by way of example without limitation. In these drawings.

DETAILED DESCRIPTION OF THE PREFERRED EMBODIMENTS

Figure 1:
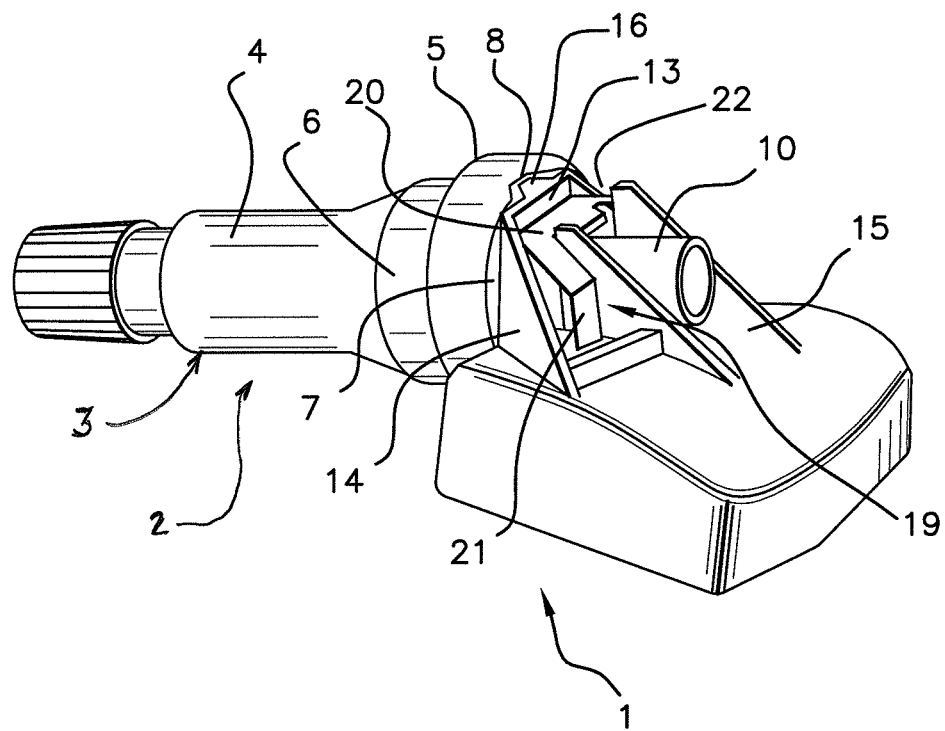
FIG. 1 is a perspective view from above of an electronic unit according to the invention.
Figure 2:
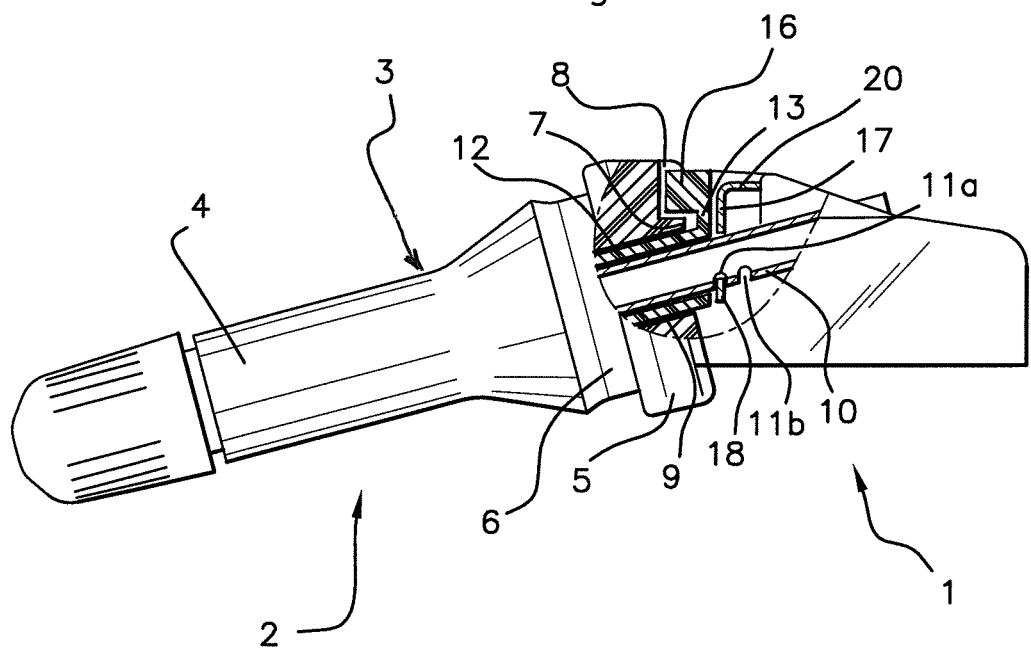
FIG. 2 is a side view with a partial cut-away of this electronic unit.

The electronic unit according to the invention illustrated by way of example in FIGS. 1 and 2 is intended to be mounted on a wheel of a vehicle for the purpose of the measurement of operating parameters (pressure, temperature, acceleration, etc.) of said wheel, and for the transmission of the measured data to a central unit (not illustrated) mounted on the vehicle.

This electronic unit is composed of an electronic module 1 adapted to be mounted in the interior of the cover of a tire, and of an inflation valve 2 for securing this electronic module 1 on the rim of the wheel equipped with this tire. This electronic module 1 and this inflation valve 2 exhibit the general characteristics of those of the electronic unit described in patent FR 2 954 733, which is considered to be an integral part of the present description, and to which reference can be made for any details of its implementation.

In the first instance, the inflation valve 2 consists of a "snap-in" inflation valve including a valve body 3 made of an elastomeric material that is subdivided, longitudinally, into a trunk 4 exhibiting possibilities of longitudinal and radial elastic deformation, and into an abutment head 5 separated from the trunk 4 by a collar 6 in the form of an annular groove delimited by two shoulders at the junction respectively with the trunk 4 and the abutment head 5.

In addition, the rear front face of the abutment head 5 extends orthogonally in relation to the longitudinal axis of the valve body 3 and includes a flat side 7 extending on a portion of the surface of said rear front face including a portion of the contour of the latter. This flat side 7 defines, furthermore, a plane face inclined at an angle equal to (90°−α), with a being in the order of 10° to 40°, in relation to the longitudinal axis of the valve body 3.

In addition, a throat 8 is arranged in the flat side 7, starting from the periphery of the latter, said throat exhibiting a U-shaped section exhibiting divergent wings. Such a throat 8 forms, in the first instance, an element for the indexation of the orientation of the valve body 3, and it is designed, for example, in such a way as to discharge, in the assembled position of the electronic module 1 and of the inflation valve 2, opposite the generator of the orifice arranged in the rim furthest from the base of said rim.

The inflation valve 2, furthermore, is pierced axially by a transverse longitudinal cylindrical bore 9 accommodating a cylindrical tube 10 made of a rigid material, having dimensions adapted to extend, on the one hand, into said bore and, on the other hand, to either side in the continuation of the valve body 3. This cylindrical tube 10 is constituted by two distinct longitudinal sections (not illustrated here, but described in a detailed manner in patent FR 2 954 733) secured in the continuation one to the other at the level of the collar 6 of the valve body 3.

The section of this cylindrical tube 10 extending in the continuation of the abutment head 5 includes, furthermore, a plurality of transverse notches such as 11a, 11b arranged at the level of the lower generator of said cylindrical tube, at a distance from the extremity of the latter as a function of the thickness of the rim equipped with the electronic unit.

The electronic module of the electronic unit is composed, for its part, of a hollow module 1 intended to accommodate "the electronics" of the electronic unit, associated with a superstructure 12 secured to said electronic module, adapted to enable it to be caused to slide along the section of the cylindrical tube 10 extending in the continuation of the abutment head 5 of the valve body 3.

This superstructure 12 formed on the electronic module 1, includes, in the first instance, a plate 13 pierced by an orifice matching the diameter of the cylindrical tube 10, arranged in such a way as to extend parallel to the flat side 7 of the abutment head 5, and as to come into correspondence with said flat side in the assembled position of the electronic module 1 and of the inflation valve 2.

In addition, a projecting lug 16 extends in relation to the plate 13, said lug being positioned and exhibiting a section adapted to enable its extremity to be accommodated in the throat 8 of the flat side 7 in the assembled position of the electronic module 1 and of the inflation valve 2.

The length of the lug 16 and the distribution of the notches 11*a*, 11*b* of the cylindrical tube 10 are adapted, furthermore, in such a way that, in this assembled position, and for each thickness of the rim intended to be equipped with the electronic unit according to the invention, a notch 11*a*, 11*b* is situated close to the posterior face of the plate 13.

The superstructure 12 includes, furthermore, two lateral gusset plates 14 and two central gusset plates 15 for reinforcing the connection of the plate 13 with the electronic module 1.

The electronic module 1 similarly includes a locking device adapted to be locked in the notch 11*a*, 11*b* close to the posterior face of the plate 13, for each rim thickness.

This locking device consists of a plate latch 17 adapted to be positioned around the tube 10, composed of a plate pierced by an orifice having a section greater than the diameter of said tube, on the edge of which and beneath which there extends a band of material 18 forming a locking tooth adapted to be accommodated in a transverse notch 11*a*, 11*b*.

This plate latch 17 is supported by elastic means adapted in order to permit it to be caused to slide along the posterior face of the plate 13 of the electronic module 1. These elastic means consist of an arch 19 (FIG. 1) adapted to be positioned on and to bear against the electronic module 1, including a principal cross-piece 20 beneath which the plate latch 17 extends, and two elastically deformable legs such as 21 adapted to bear against the electronic module 1.

In addition, notches 22 arranged in the central gusset plates 15 are adapted to ensure the positioning of the cross-piece 20 and thus of the plate latch 17 secured to said cross-piece.

Such an arch 19 is designed to permit sliding of the plate latch 17 between:
- a position of locking obtained in the absence of a load applied to the cross-piece 20, in which the locking tooth 18 is engaged in a notch 11*a*, 11*b* of the cylindrical tube 10,
- and a position of unlocking obtained by a pressure applied to the cross-piece 20 of the arch, 19, in which the locking tooth 18 is present on the exterior of the notch 11*a*, 11*b* and allows a relative displacement in translation of the electronic module 1 relative to the cylindrical tube 10.

At the time of installation of an electronic unit according to the invention, undertaken, for example, in particular in order to replace a defective inflation valve 2, the new inflation valve is positioned, in the first instance, by orienting the latter in such a way that the throat 8 discharges opposite the generator of the orifice arranged in the rim furthest from the base of said rim.

In order for the lug 16 to be accommodated in the throat 8, this orientation causes the electronic module 1 to be oriented in such a way that the base of said electronic module, being orthogonal in the example in the plane of the plate 13, is inclined by the angle α in relation to the longitudinal axis of the valve body 3.

In addition, once the locking of the electronic module 1 has been accomplished by means of the plate latch 17, a simple observation of the position of the extremity of the lug 16 permits verification of whether the locking tooth 18 is accommodated in the notch 11*a*, 11*b* corresponding to the thickness of the rim equipped with the electronic unit:
- positioning of the extremity of the lug 16 in the throat 8, representative of a distance between front faces (flat side 7, plate 13) equal to the predetermined minimum distance, results in validation of the position of locking,
- positioning of the extremity of the lug 16 at a distance from the front face constituted by the flat side 7 leads to the conclusion that the notch 11*a*, 11*b*, in which the locking tooth 18 is accommodated, does not constitute the notch suitable for the thickness of the utilized rim.

The tracking means constituted by the throat 8 arranged in the flat side 7 and the lug 16 formed on the plate 13, accordingly serve, on the one hand, as elements for the indexation of the orientation of the inflation valve 2 and of the electronic module 1 and, on the other hand, as control elements permitting the verification of the locked position of the electronic module 1.

In addition, the provision of the lug 16 permits the accidental destruction of the connection between the electronic module 1 and the inflation valve 2 to be avoided during removal of the tire, by the introduction of the edge of the tire between the plate 13 and the flat side 7. This introduction of the edge of the tire is, in fact, rendered impossible by the presence of the lug 16 in the throat 8.

The invention claimed is:

1. An electronic unit for measuring operating parameters of a vehicle wheel, the electronic unit comprising:
   an inflation valve including
   a valve body configured to extend through an orifice in a wheel rim, and comprised of a trunk and an abutment head against the rim, and
   a rigid hollow tube extending in a continuation of the abutment head;
   an electronic module configured to be mounted in a slidable manner around the rigid tube; and
   a securing system configured to secure the electronic module and the inflation valve in a locked position of said electronic module, the electronic module extending in a direct continuation of the abutment head of said inflation valve, the securing system comprising
   a locking system including locking devices for relative locking in translation of the electronic device along the rigid tube, defining at least two positions of relative locking, each of the locking devices being configured to correspond to a preselected thickness of the rim to be equipped with the electronic unit,
   wherein the electronic device and the abutment head of the inflation valve comprise:
      two complementary front faces configured to come into correspondence in the locked position of the electronic device, at a predetermined minimum distance from each other that is identical for all preselected thicknesses of rims to be equipped with the electronic unit, and
      optical tracking devices configured to optically track a longitudinal position of the electronic device along the rigid tube, configured to permit verification of whether the distance separating the two complementary front faces, in the locked position of said electronic device, corresponds to the predetermined minimum distance, the optical tracking devices including at least one projecting lug extending in relation to the front face of one of the electronic device and the abutment head and having a length substantially greater than the minimum predetermined distance for the locked position of the electronic device, and a recess configured to accommodate an extremity of the lug, arranged opposite one another in the front face of the other of the electronic device and the abutment head.

2. The electronic unit as claimed in claim 1, wherein the inflation valve is a snap-in type and includes:
- the valve body that is made of an elastomeric material, provided with a longitudinal axial bore and composed of the trunk that is elastically-deformable and the abutment head separated from the trunk by a collar configured to be positioned in a sealed manner in the orifice in the rim, and
- a hollow tubular core made of a rigid material having dimensions configured to be accommodated in the bore of the valve body of the inflation valve and to extend to either side in the continuation of said valve body, said tubular core being constituted by two longitudinal sections arranged one in relation to the other and relative to the valve body to allow an elastic deformation of the trunk to permit the installation of the inflation valve through the orifice of the rim.

3. The electronic unit as claimed in claim 2, wherein the locking system includes
- the locking devices that are disposed on the periphery of the rigid tube, the locking devices including at least two transverse notches,
- a plate latch associated with the electronic device and exhibiting a plate latch locking device including a locking tooth configured to be accommodated in one of the transverse notches of the rigid tube, in the locked position of the electronic device, said plate latch being mounted on the electronic device and being configured to deflect between a position of locking in which the locking tooth is engaged in one of the notches of the rigid tube, and a position of unlocking in which the locking tooth allows a relative displacement in translation of the electronic device relative to the rigid tube and being associated with an elastic device configured, in the absence of loads, to apply a force to the plate latch to maintain the plate latch in the locking position, and when an influence is exerted on the elastic device, to cause a displacement of the plate latch towards the unlocking position.

4. The electronic unit as claimed in claim 1, wherein the locking system includes
- the locking devices that are disposed on the periphery of the rigid tube, the locking devices including at least two transverse notches,
- a plate latch associated with the electronic device and exhibiting a plate latch locking device including a locking tooth configured to be accommodated in one of the transverse notches of the rigid tube, in the locked position of the electronic device, said plate latch being mounted on the electronic device and being configured to deflect between a position of locking in which the locking tooth is engaged in one of the notches of the rigid tube, and a position of unlocking in which the locking tooth allows a relative displacement in translation of the electronic device relative to the rigid tube and being associated with an elastic device configured, in the absence of loads, to apply a force to the plate latch to maintain the plate latch in the locking position, and when an influence is exerted on the elastic device, to cause a displacement of the plate latch towards the unlocking position.

5. The electronic unit as claimed in claim 1, wherein the lug is positioned, in an assembled position of the electronic device and the inflation valve, opposite a generator of the orifice arranged in the rim furthest from a base of said rim.

6. The electronic unit as claimed in claim 1, wherein the complementary front faces of the electronic device and the abutment head include are parallel and disposed such that said electronic module is inclined at an angle of 10° to 40° in relation to the longitudinal axis of the valve body.

* * * * *